United States Patent [19]

Okubo et al.

[11] Patent Number: 5,077,895
[45] Date of Patent: Jan. 7, 1992

[54] EXFOLIATING DEVICE FOR SYNTHETIC RESIN COVER LAYER OF CABLE

[75] Inventors: Kimio Okubo, Yuki; Haruhisa Suto, Tochigi, both of Japan

[73] Assignee: Fujitsu Limited, Kawasaki, Japan

[21] Appl. No.: 444,153

[22] PCT Filed: Apr. 7, 1989

[86] PCT No.: PCT/JP89/00377
§ 371 Date: Nov. 13, 1989
§ 102(e) Date: Nov. 13, 1989

[87] PCT Pub. No.: WO89/10020
PCT Pub. Date: Oct. 19, 1989

[30] Foreign Application Priority Data

Apr. 11, 1988 [JP] Japan ................... 63-88782

[51] Int. Cl.⁵ ............................... B26B 77/00
[52] U.S. Cl. ......................... 30/90.6; 30/90.7
[58] Field of Search ............ 30/90.3, 90.4, 90.6, 30/90.7, 90.8, 90.9, 91.1; 81/9.42, 9.4; 83/947

[56] References Cited

U.S. PATENT DOCUMENTS 3,623,384  11/1971  Murphy .................. 30/90.6

Primary Examiner—Douglas D. Watts
Attorney, Agent, or Firm—Staas & Halsey

[57] ABSTRACT

An exfoliating device of the invention has a front body (12) on which a first cutter (14) is mounted, and a rear body (15) having a second cutter (16) thereon and mounted for rotation on the front body. A guide hole (13) into which a cable (11) is to be inserted is formed in the front body (12), and the cutter (14) is mounted in an inclined relationship with respect to the direction of an axis of the guide hole. The second cutter (16) is mounted in parallel to the direction of the axis of the guide hole. With the construction, when the front body (12) is rotated, spiral cutting of a cover layer is carried out by the first cutter (14) while linear cutting is carried out by the second cutter (16). With the advancement of the exfoliating device, a cover layer of a cable can be exfoliated readily.

9 Claims, 8 Drawing Sheets

EXFOLIATING DEVICE FOR SYNTHETIC RESIN COVER LAYER OF CABLE

BACKGROUND OF THE INVENTION

1. Field of the Invention

This invention relates to an exfoliating device for a synthetic resin cover layer of a cable.

2. Description of Related Art

An assembly of conductors with insulator layers provided thereon or optical fibers which have a common cover layer provided thereon is commonly called cable. Cables for communications are roughly divided into a land cable and a submarine cable, but either of such cables commonly has a synthetic resin cover layer provided as an outermost layer thereon. Since an optical submarine cable transmission system using, for example, an optical submarine cable is superior in prevention of noises and in delay time and can assure maintenance of secrecy comparing with transmission quality of radio communications based on a communications satellite or conventional short waves, it is employed widely as international as well as domestic communications means. In order to connect such a cable as an optical submarine cable to a relay or the like, it is necessary to exfoliate all cover layers at a terminal end portion of the cable to expose a core of the cable. Since such an exfoliating operation is normally done at a site where the cable is to be installed in a bad operating situation, it is demanded for the exfoliating operation to be high in operability.

Figure 1:
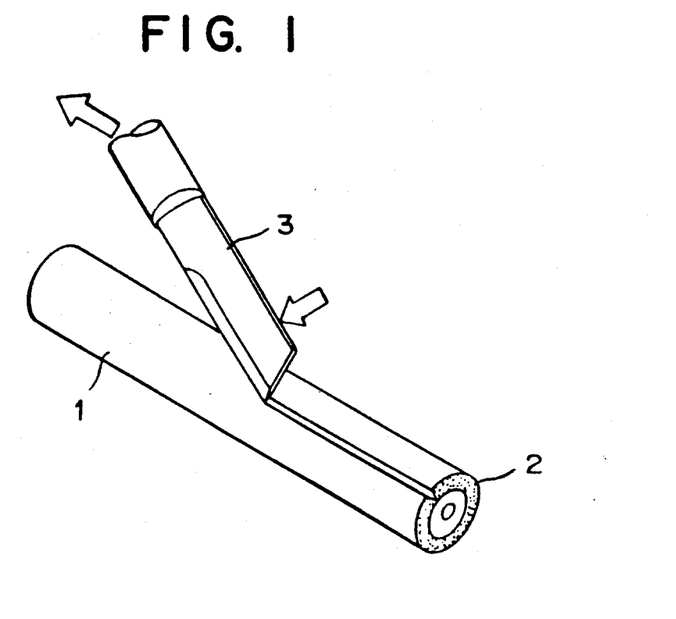
FIG. 1 is a schematic view illustrating a conventional exfoliating method of a synthetic resin cover layer of a cable.
Figure 2:
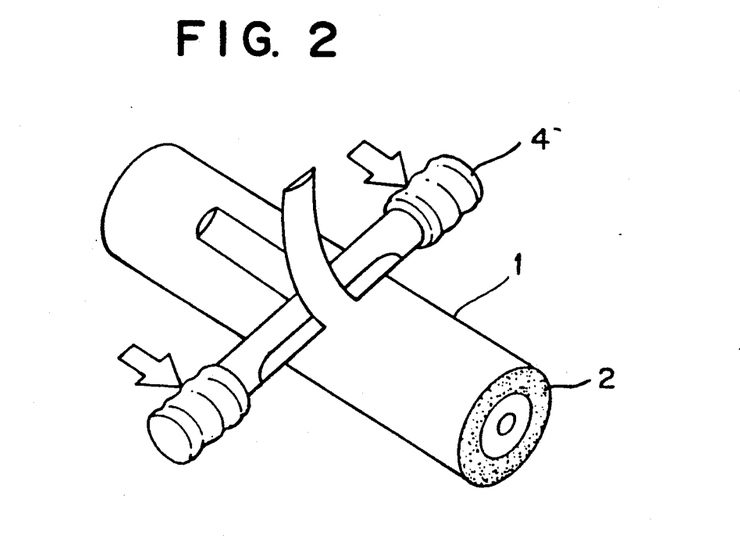
FIG. 2 is a similar view but illustrating another conventional exfoliating method.

An exemplary one of conventional methods of exfoliating a synthetic resin cover layer of a cable is illustrated in FIG. 1. In particular, a blade of a knife 3 is held to a synthetic resin cover layer 2 of an optical submarine cable 1 and then drawn by a predetermined distance in a direction of an axis of the cable 1 whereafter the cover layer 2 is exfoliated from a core. Such a method as illustrated in FIG. 2 is also employed conventionally. As seen in FIG. 2, a dedicated plane 4 having knobs provided at the opposite ends thereof is used, and the plane 4 is gripped by the opposite hands of an operator and held to a cover layer 2 of a cable 1 and drawn forwardly to shave the cover layer 2.

However, the exfoliating method illustrated in FIG. 1 has drawbacks that it is difficult to maintain the holding force of the knife 3 fixed and since the depth of the cut may vary, a cutting operation may have to be repeated several times and that a layer under the cover layer 2 to be exfoliated may sometimes be damaged. Further, when the cover layer 2 is hard or thick, the blade of the knife 3 may not cut into the cover layer 2 and it is difficult to exfoliate the cover layer 2.

On the other hand, with the conventional method illustrated in FIG. 2, since the cover layer 2 is shaved by the plane 2, the plane 2 must be operated several times to shave the cover layer 2 until the cover layer 2 is exfoliated. Accordingly, there is a problem that a long period of time is required until the cover layer 2 is exfoliated. Further, even if the cable 1 is fixed, it still moves a little, and when the cover layer 2 is shaved by a great distance, the cable 1 often becomes uneven or is brought out of a straightened or flattened condition. Also, since biting of the blade of the plane 4 into the cover layer 2 is not fixed, the cover layer 2 cannot be shaved into a fixed thickness, and there is a possibility that the plane 4 may be let off from the cable 1 and the operator may be hurt by the plane 4.

Accordingly, it is an object of the present invention to provide an exfoliating device for a synthetic resin cover layer of a cable by which, overcoming the drawbacks of the conventional methods described above, an exfoliating operation of a synthetic resin cover layer of a cable can be carried out in safety and with certainty and the synthetic resin cover layer can be exfoliated in a short period of time.

SUMMARY OF THE INVENTION

According to the present invention, there is provided a device for exfoliating a synthetic resin cover layer of a cable which fits on a synthetic resin cover layer of a cable having a circular cross section and cuts and exfoliates, when rotated, the cover layer while advancing relative to the cable. The exfoliating device comprises a front body having a circular guide hole formed therein into which the cable is to be inserted. The exfoliating device also includes, a first cutter having a cutting blade at an end thereof and secured to the front body such that the cutting blade thereof is projected toward an axis of the circular guide hole at a rear location of the circular guide hole and which first cutter extends in an inclined relationship by a predetermined angle with respect to the direction of the axis of the guide hole. The exfoliating device further includes a rear body mounted for rotation on the front body, and a second cutter having a cutting blade at an end thereof and secured to the rear body such that the cutting blade is projected toward the axis of the guide hole and which second cutter extends in parallel to the direction of the axis of the guide hole.

Since the first cutter is secured to the front body such that the cutting blade thereof may extend in an inclined relationship by the predetermined angle with respect to the direction of the axis of the guide hole, if a cable having a synthetic resin cover layer thereon is inserted into the guide hole and the front body is rotated until the cutting blade of the first cutter bites into the synthetic resin cover layer of the cable, then the first cutter will thereafter cut the synthetic resin cover layer into a spiral by the same action as in threading while it advances at a pitch depending upon the inclination angle. The succeeding second cutter is drawn by the front body to advance, and after the cutting blade thereof bites into the cover layer of the cable, the second cutter is advanced only in the direction of the axis without being rotated while cutting the cover layer since the rear body to which the second cutter is secured is mounted for rotation relative to the front body. Consequently, linear cutting of the cover layer by the second cutter is added to continuous spiral cutting by the first cutter so that the synthetic resin cover layer is cut into a fine piece for each fixed distance and exfoliated from a core of the cable.

In order to facilitate such exfoliation, preferably at least two such second cutters are provided in a spaced relationship in a circumferential direction, and further preferably, a plurality of handles are mounted on an outer peripheral face of the front body.

Further, according to a preferable embodiment, the front body includes a first body segment and a second body segment secured in an integral relationship to the first body segment by a fastening means. With the construction, if the fastening means is loosened and the first body segment is turned around a shaft relative to the second body segment, the front body can be opened, and after completion of exfoliation of a synthetic resin cover layer of a cable, the exfoliating device can be removed readily from the cable.

The first cutter and the second cutter are mounted on the front body and the rear body, respectively, such that the distance over which they are projected toward the center axis of the guide hole can be adjusted, and normally, they are mounted such that they may be projected toward the center axis of the guide hole over a distance substantially equal to the thickness of the synthetic resin cover layer of the cable to be exfoliated by the first and second cutters.

Further, a driven ring gear may be secured to an outer peripheral face of the front body and operatively coupled to a driving means by way of a driving gear so as to carry out an exfoliating operation with an external power.

DESCRIPTION OF THE PREFERRED EMBODIMENTS

In the following, the present invention will be described in detail with reference to the drawings.

Figure 3:
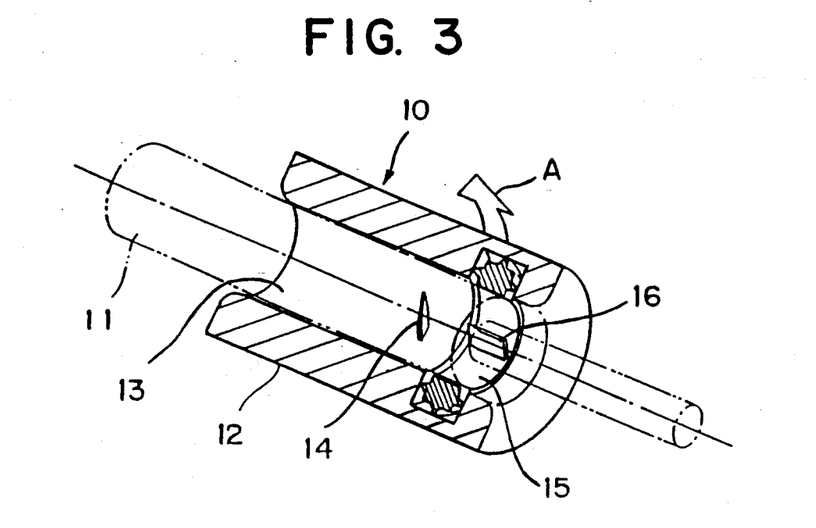
FIG. 3 is a schematic view, partly in section, illustrating a principle of the present invention.

FIG. 3 is a schematic view illustrating a principle of the present invention. A circular guide hole 13 having a diameter a little greater than the outer diameter of a cable 11 having a circular cross section is formed at a front portion of a body 12 of an exfoliating device 10. A first cutter 14 having a cutting blade at an end thereof is secured to the body 12 in an inclined relationship by a predetermined angle with respect to the direction of an axis of the guide hole 13 and is projected toward the center axis of the guide hole 13 by a distance substantially equal to the thickness of a cover layer of the cable 11 to be exfoliated. A rear body 15 is mounted at a rear portion of the body 12 for rotation relative to the body 12. A second cutter 16 having a cutting blade at an end thereof is secured to the rear body 15 such that it is projected by the equal distance to that of the first cutter 14 toward the center axis of the guide hole 13 and extends in parallel to the direction of the axis of the guide hole 13.

Since the first cutter 14 is secured to the body 12 in an inclined relationship by the predetermined angle from the direction of the axis of the guide hole 13, if a cable 11 having a synthetic resin cover layer thereon is inserted into the guide hole 13 and the body 12 is rotated in the direction of an arrow mark A to cause the cutting blade of the first cutter 14 to bite into the cover layer of the cable 11, as the body 12 is rotated after then, the first cutter 14 cuts the cover layer into spirals by a similar action as in threading while the cutter 14 is advanced at a pitch depending upon the inclination angle of the first cutter 14 together with the body 12. The succeeding second cutter 16 is drawn to advance by the body 12, and after a leading end edge of the cutting blade thereof cuts into the cover layer, the second cutter 16 is advanced only in the axial direction without being rotated together with the body 12 because the rear body 15 is mounted for rotation relative to the body 12. Accordingly, linear cutting of the cover layer by the second cutter 16 is added to continuous spiral cutting by the first cutter 14 so that the cover layer of the cable 11 is cut finely for each predetermined distance and exfoliated from a core of the cable 11.

Since the first cutter 14 and the second cutter 16 are caused to cut the cover layer of the cable 11 to effect exfoliation of the cover layer by rotating the body 12 of the exfoliating device in a coaxial relationship to the cable 11 under the guidance of the guide hole 13, the depth of such cut of the cover layer can be maintained uniform. Further, while the inclination angle of the first cutter 14 has an influence on the speed of advancement of the same, since the resistance to such cutting differs depending on the thickness or the material of the synthetic resin cover layer and has an influence on the magnitude of a turning force of the body 12, if an appropriate angle is selected for the inclination angle taking the speed of advancement and the turning force into consideration, then the operation efficiency can be set to a maximum level.

Figure 4:
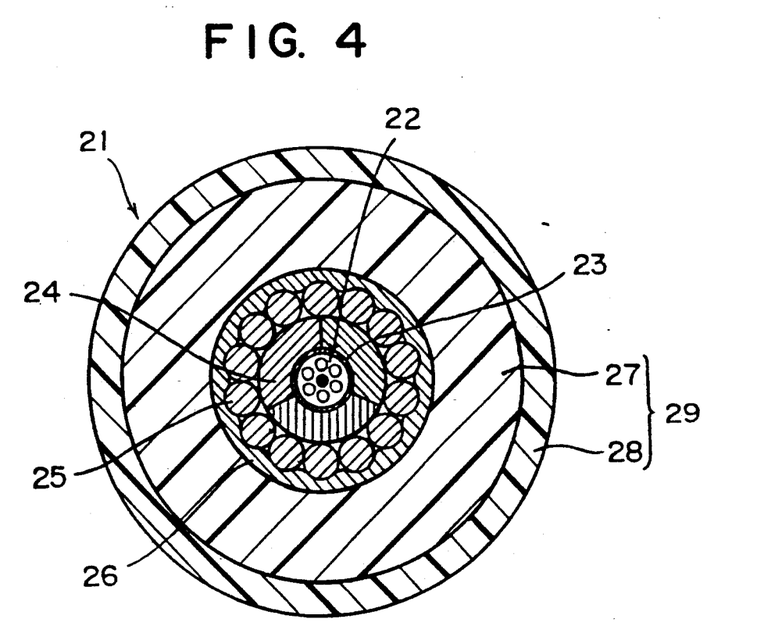
FIG. 4 is a cross sectional view of an optical submarine cable to which the present invention can be applied.

FIG. 4 is a cross sectional view of an optical submarine cable to which an exfoliating device of the present invention can be applied. An optical fiber unit 22 wherein six single mode fibers are disposed around a center steel wire is disposed at the center of an optical submarine cable 21. An outer periphery of the optical fiber unit 22 is covered with a three-split iron pipe 24 with a water penetration preventing compound layer 23 interposed therebetween in order to provide the optical fiber unit 22 with a water pressure bearing property. Up to 14 high tensile strength piano wires 25 are accommodated in a stranded condition between the three-split iron pipe 24 and a copper tube 26 which serves as a power supply conductor. A low density polyethylene insulator member 27 and a high density polyethylene housing 28 which form a synthetic resin cover layer 29 are provided on an outer periphery of the copper tube 26. Exfoliation of the low density polyethylene insulator member 27 and the high density polyethylene housing 28 of such an optical submarine cable 21 as described just above requires a long period of time according to any conventional method which is very low in operability. Where an exfoliating device of the present invention is applied to such optical submarine cable 21, the synthetic resin cover layer 29 can be exfoliated at a high efficiency.

Figure 5:
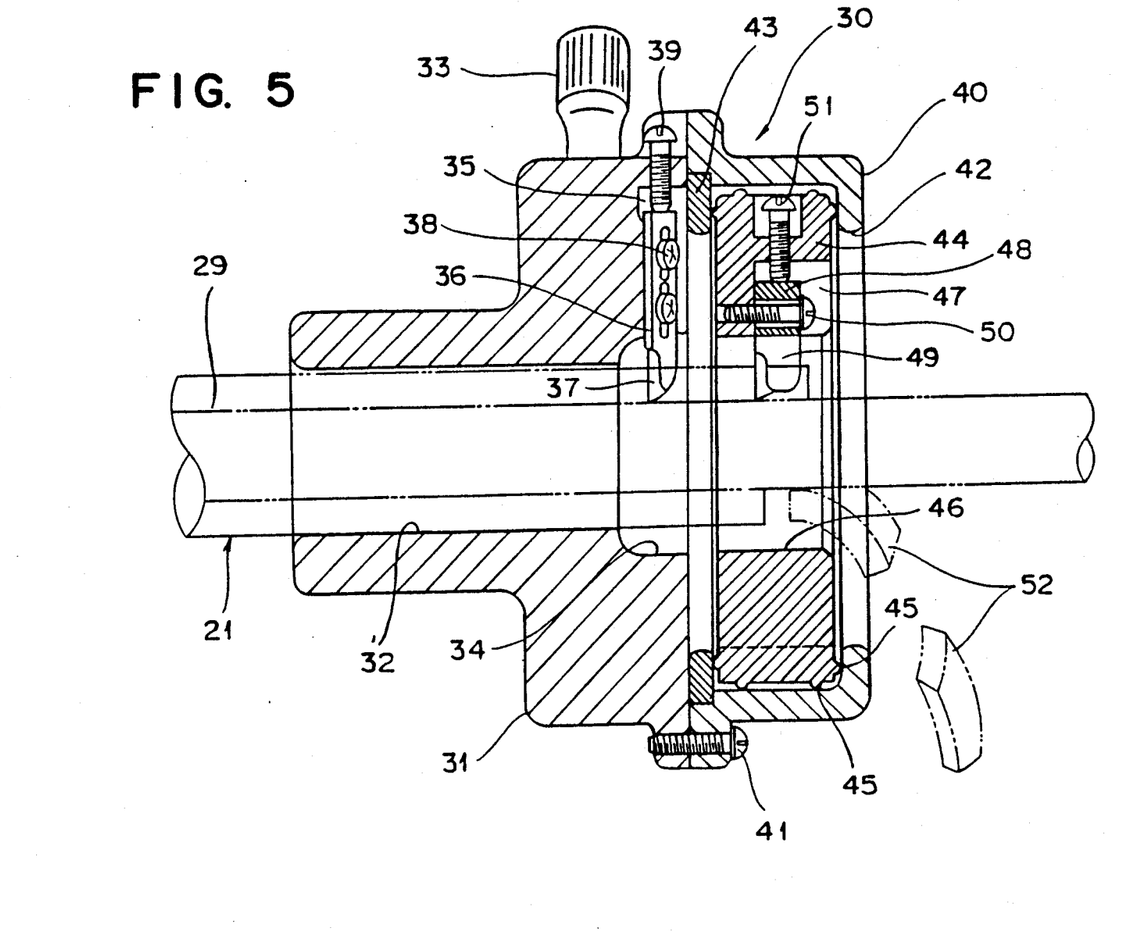
FIG. 5 is a schematic sectional view of an exfoliating device showing an embodiment of the present invention.

FIG. 5 is a sectional view showing an embodiment of the present invention. A circular guide hole 32 having a diameter a little greater than the outer diameter of an optical submarine cable 21 is formed in a front body 31 of an exfoliating device 30. A plurality of handles 33 extend radially from an outer peripheral face of the front body 31. Another hole 34 having a greater diameter than the guide hole 32 is formed at a location of the front body 31 rearwardly of the guide hole 32, and a cutter mounting groove 35 is formed in a communicating relationship to the hole 34. Wall faces defining the cutter mounting groove 35 are formed in an inclined relationship by a predetermined angle from the direction of an axis of the guide hole 32, and a cutter 36 in the form of a flat plate having a cutting blade 37 at an end thereof is secured to the wall face of the cutter mounting groove 35 by means of fastening screws 38. Before the cutter 36 is secured by means of the fastening screws 38, and end portion of the cutter 36 is pushed in a radial direction by a set-screw 39 while the fastening screws 38 are in a loosened condition to adjust the cutter 36 so that the extent over which the cutter 36 is projected may be substantially equal to the thickness of a cover layer 29 of the submarine cable 21, and after such adjustment, the fastening screws 38 are tightened.

A lid member 40 having a circular opening 42 of a large diameter is secured to the front body 31 by means of screws 41. A rear body 44 is mounted for rotation between the front body 31 and the lid member 40 with an annular partition wall 43 interposed therebetween. In particular, a plurality of convex ring formations 45 are formed on an outer circumferential face and the opposite end faces of the rear body 44, and the rear body 44 is mounted for rotation relative to the front body 31 by way of the convex ring formations 45. A hole 46 having a substantially same diameter as that of the hole 34 formed in the front body 31 is formed in the rear body 44, and a cutter mounting groove 47 is formed in a communicating relationship to the hole 46. A cutter 48 having a cutting blade 49 at an end thereof is inserted in the cutter mounting groove 47 and secured to the rear body 44 by means of a fastening screw 50 so that the cutting blade thereof may extend in parallel to the direction of the axis of the guide hole 32. The extent over which the cutter 48 is projected is adjusted by a set-screw 51 and set such that it may be substantially equal to the thickness of the cover layer 29 of the cable 21 similarly to the extent of projection of the cutter 36.

While in the present embodiment the cutters 36 and 48 are shown as one cutter each, this is intended for simplification of the drawings, and actually, two such cutters 36 and two such cutters 48 are secured at symmetrical positions of the front body 31 and the rear body 44, respectively, which assures smooth coaxial rotational movement of the exfoliating device 30.

Description will be subsequently given of operation of the exfoliating device of the present embodiment having a construction as described above.

At first, an optical submarine cable 21 is inserted into the guide hole 32 of the exfoliating device 30 and pushed in until the cutting blades 37 of the cutters 36 cut into an end face of the cable 21, and then the handles 33 are operated to rotate the front body 31 in one direction. Thus, as the front body 31 rotates in a coaxial relationship to the cable 21 under the guidance of the guide hole 32, the cutters 36 mounted in an inclined relationship on the front body 31 are rotated so that they cut the synthetic resin cover layer 29 continuously into two spirals while they advance. While the cutters 48 are advanced simultaneously as such advancement of the cutters 36, since they are mounted on the rear body 44 mounted for rotation on the front body 31 such that the cutting blades 49 thereof may extend in parallel to the direction of the axis of the guide hole 32, the cutters 48 advance without making a rotation. Consequently, the cover layer 29 is cut and exfoliated into a cover layer piece 52 for each half rotation of the cutters 36 as a result of linear cutting by the cutters 48 in addition to spiral cutting by the cutters 36.

Figure 6:
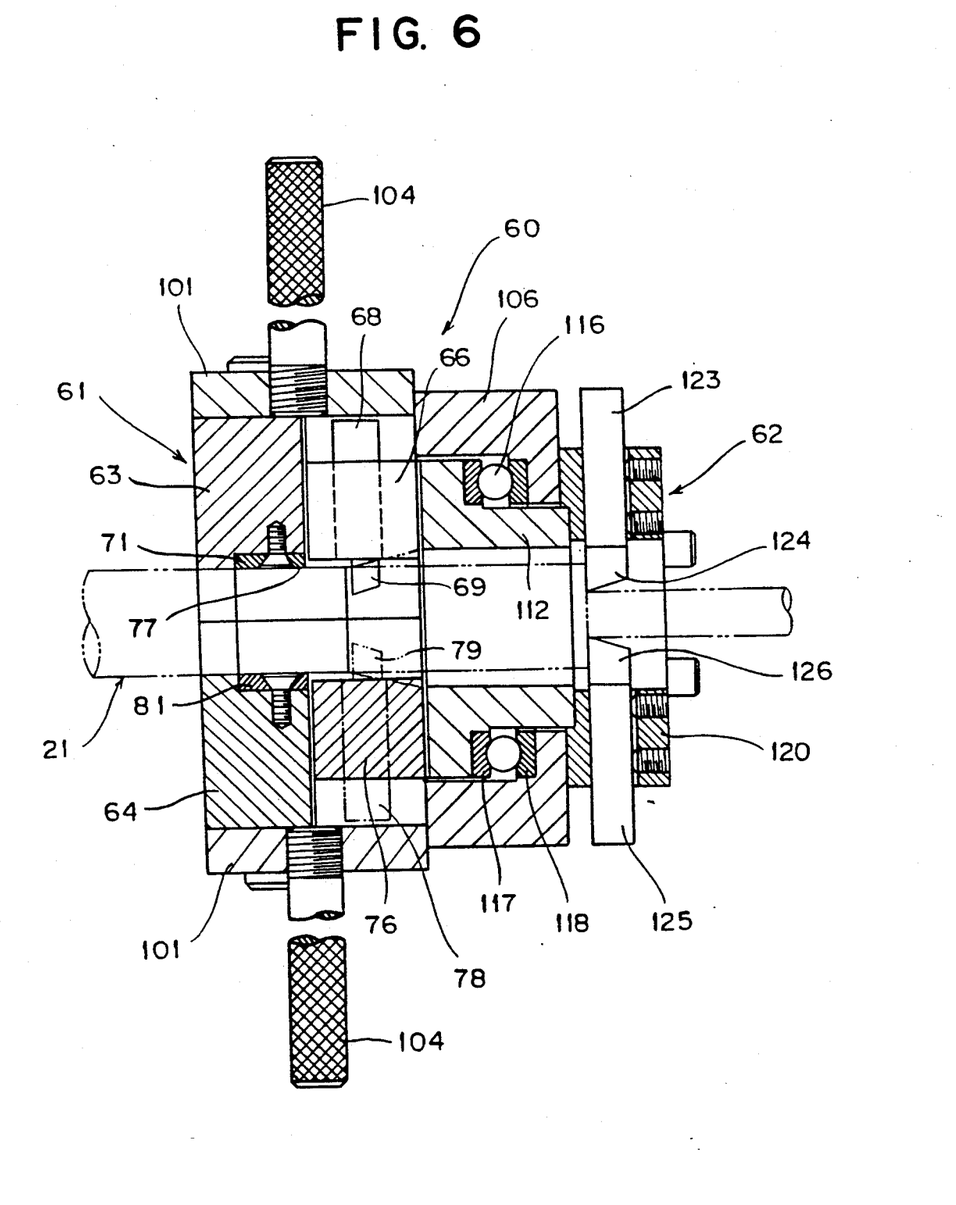
FIG. 6 is a sectional view showing another embodiment of the present invention.
Figure 7:
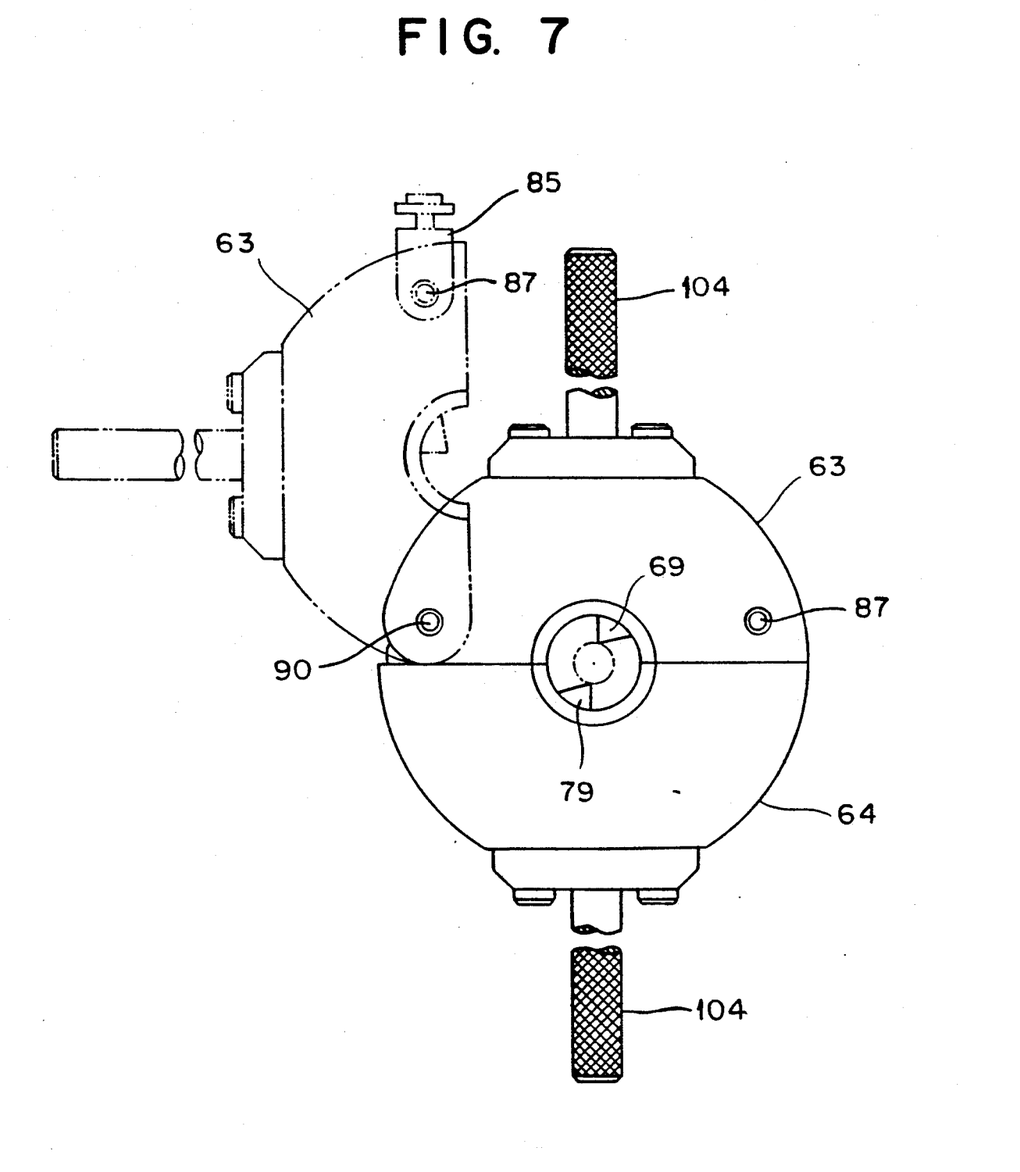
FIG. 7 is a left-hand side elevational view of the exfoliating device of FIG. 6 with a front body in an open condition shown in phantom.
Figure 8:
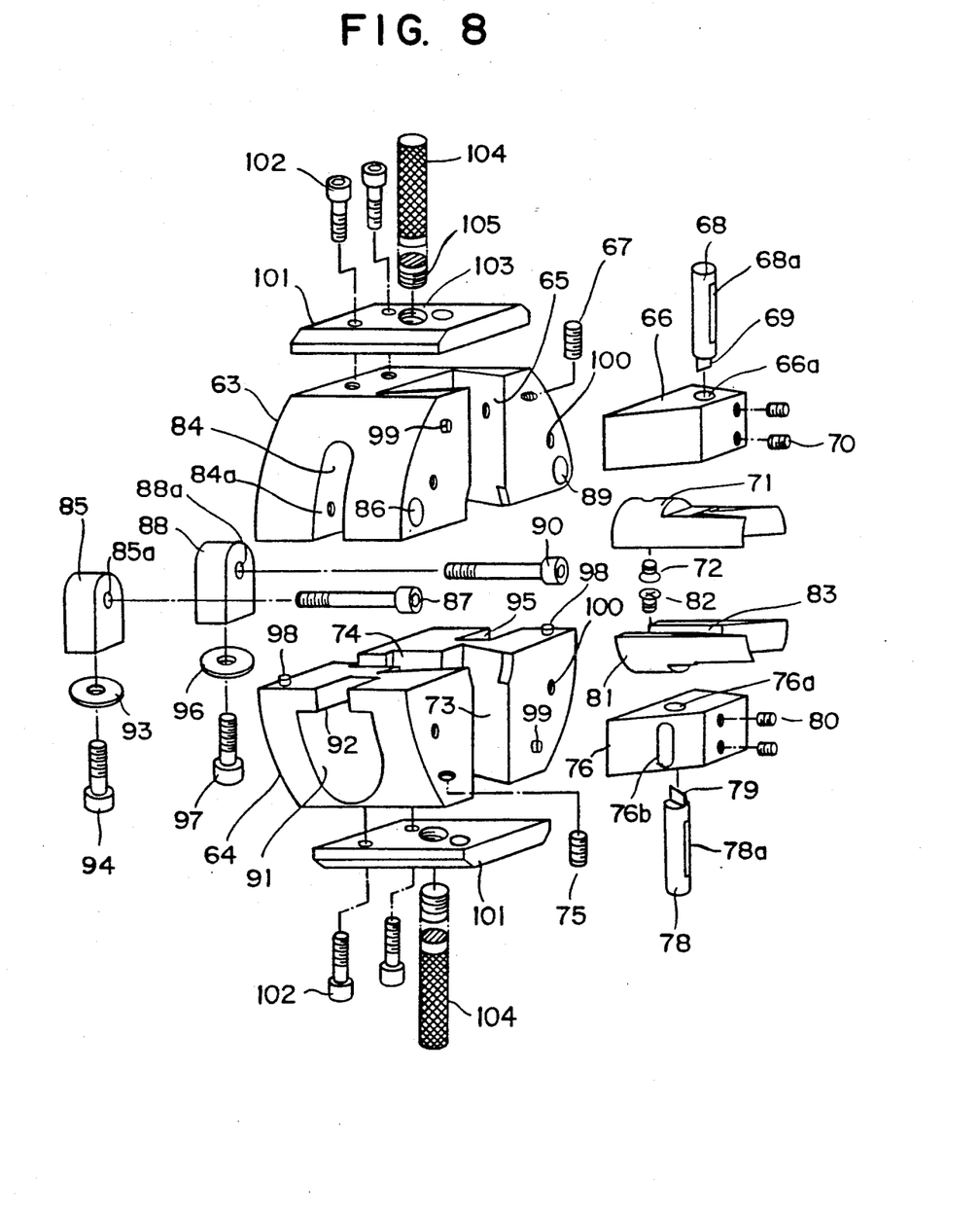
FIG. 8 is an exploded perspective view of the front body of the exfoliating device of FIG. 6.
Figure 9:
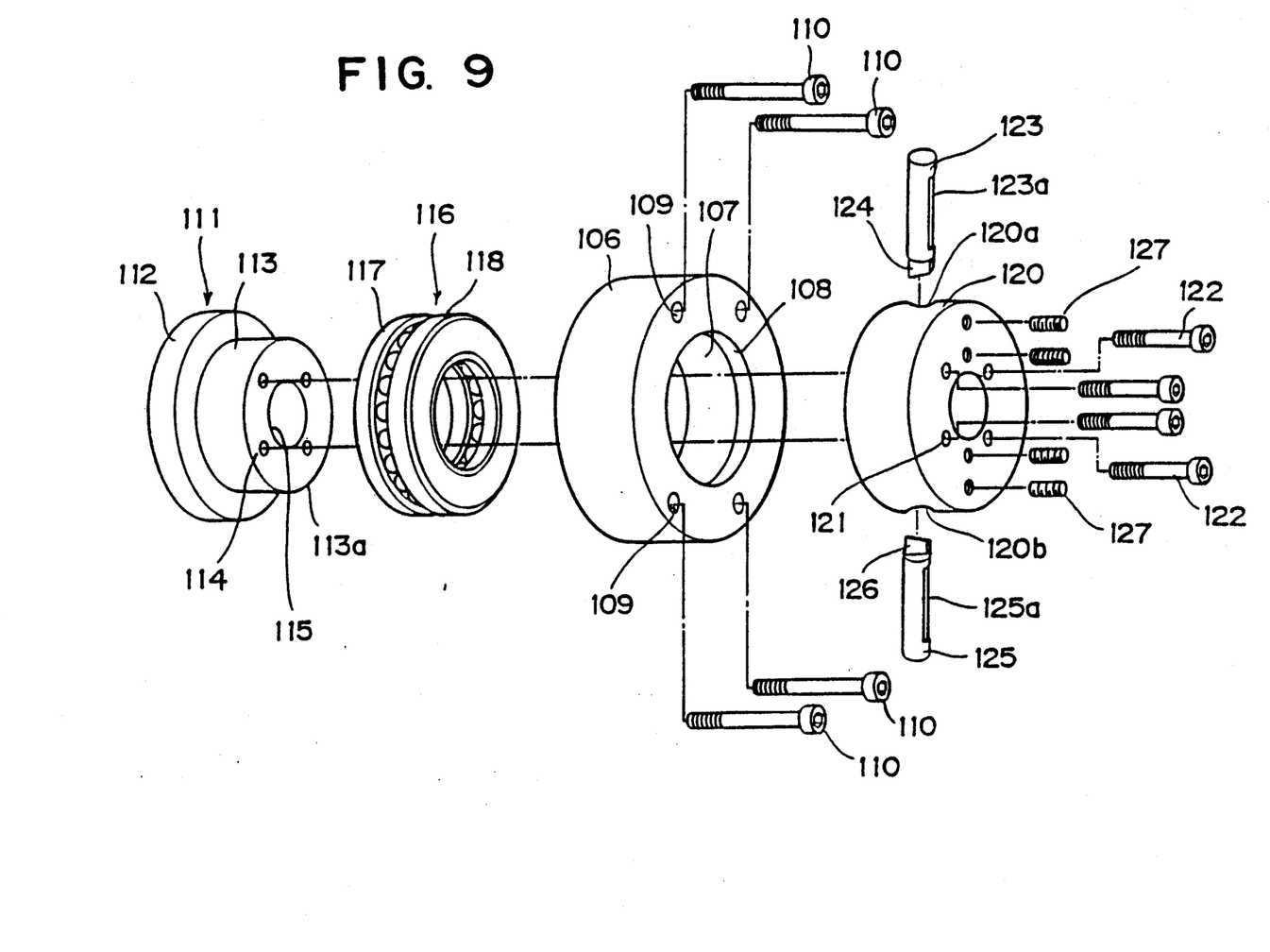
FIG. 9 is an exploded perspective view of a rear body of the exfoliating device of FIG. 6.

Subsequently, another embodiment of the present invention will be described with reference to FIGS. 6 to 9. FIG. 6 is a sectional view of an exfoliating device of the second embodiment of the present invention, FIG. 7 is a left-hand side elevational view of the exfoliating device of FIG. 6, FIG. 8 is an exploded perspective view of a front body of the exfoliated device of FIG. 6, and FIG. 9 is an exploded perspective view of a rear body of the exfoliating device of FIG. 6.

An exfoliating device 60 includes a front body 61 and a rear body 62 mounted for rotation on the front body 61. The front body 61 is composed of a first body segment 63 and a second body segment 64. As best shown in FIG. 8, a first mounting groove 65 is formed on the first body segment 63 and extends from an upper end face to a lower end face through the first body segment 63, and a shallower second mounting groove not shown is formed on the lower end wall of the first body segment 63 in a contiguous relationship to the first mounting groove 65. A mounting block 66 is inserted in the first mounting groove 65 and secured therein by means of a set-screw 67. A mounting hole 66a is formed in the mounting block 66, and a cutter 68 having a cutting blade 69 at an end thereof is inserted in and secured to the mounting hole 66a by means of a pair of set-screws 70 in such a condition that the cutting blade 69 thereof may be inclined by a predetermined angle from the direction of the axis of a guide hole 77. Further, a half-split member 71 defining the circular guide hole 77 therein is mounted in the second mounting groove not shown by means of a screw 72.

A first mounting groove 73 is formed also on the second body segment 64 and extends from an upper end face to a lower end face through the second body segment 64, and a shallower second mounting groove 74 is formed in a contiguous relationship to the first mounting groove 73 on the upper end wall of the second body segment 74. A mounting block 76 is inserted in and secured to the first mounting groove 73 by means of a set-screw 75. The mounting block 76 has a mounting hole 76a formed therein, and a cutter 78 having a cutting blade 79 at an end thereof is inserted in and secured to the mounting hole 76a by means of a set-screw 80 such that the cutting blade 79 thereof extends in an inclined relationship by a predetermined angle from the direction of the axis of the guide hole 77. A shallow recess 76b is formed on a side wall of the mounting block 76, and the set-screw 75 is engaged in the recess 76b to secure the mounting block 76 in the first mounting groove 73. A half-split member 81 is inserted in the second mounting groove 74 of the second body segment 64. The half-split member 81 has an arcuate inner peripheral face 83 provided thereon, and the guide hole 77 is defined by the arcuate inner peripheral face 83 and a corresponding arcuate inner peripheral face formed on the half-split member 71.

A vertically elongated groove 84 is formed on a side wall of the first body segment 63, and a similar groove is formed also on the other side wall of the first body segment 63. A block 85 is inserted into the vertically elongated groove 84 and a bolt 87 is inserted into a hole 86 formed in the first body segment 63 and another hole 85a of the block 85 and screwed into a threaded hole 84a of the first body segment 63 to mount the block 85 for rotation in the groove 84. Similarly, another bolt 90 is inserted into a hole 89 formed in the first body segment 63 and another hole 88a of a block 88 and screwed into a threaded hole not shown formed in the first body segment 63 to mount the block 88 for rotation in the groove not shown.

In the meantime, a stepped groove 91 is formed on a side wall of the second body segment 64, and a substantially similar stepped groove 95 is formed on the other side wall of the second body segment 64. Though not particularly shown, a reduced thickness portion having a hole in which a mounting screw 97 is inserted is provided in an integral relationship with the second body segment 64 in the stepped groove 95. The blocks 85 and 88 mounted on the first body segment 63 are inserted into upper end portions of the stepped grooves 91 and 95, respectively, and the mounting screws 94 and 97 are tightened into threaded holes formed in lower end walls of the blocks 85 and 88 with washers 93 and 96 contacted with the stepped portions 92, respectively, to integrally secure the first body segment 63 and the second body segment 64 to each other.

When the mounting screw 94 is in a little loosened condition, if the first body segment 63 is turned around the bolt 90 with respect to the second body segment 64, then the unit consisting of the block 85, washer 93 and mounting screw 94 can be drawn off in a sideward direction from the stepped groove 91, and the first body segment 63 can be opened with respect to the second body segment 64 as shown in phantom in FIG. 7. It is to be noted that, since the reduced thickness portion having the hole in which the mounting screw 97 is inserted is provided in the stepped groove 95 as described hereinabove, the unit consisting of the block 88, washer 96 and mounting screw 97 cannot be drawn off from the stepped groove 96 unless the mounting screw 97 is completely removed from the block 88.

A pair of positioning pins 98 are provided at the upper end face of the second body segment 64 while a pair of holes corresponding to the positioning pins 98 are formed at the lower end wall of the first body segment 63. Further, a positioning pin 99 is provided and a pair of threaded holes 100 are formed at each of the end walls of the first body segment 63 and the second body segment 64. A knob mounting plate 101 is secured to each of the upper end wall of the first body segment 63 and the lower end face of the second body segment 64 by means of a pair of fastening screws 102. A threaded hole 103 is formed in each of the knob mounting plates 101, and a handle 104 having a threaded portion 105 formed at an end portion thereof is screwed in the threaded hole 103 to mount the handle 104 on a circumferential wall of the front body 61 as shown in FIG. 6.

Subsequently, structure of the rear body 62 will be described with reference to FIG. 9. A cylindrical member 106 has a larger diameter hole 107 and a smaller diameter hole 108 formed therein and has four through-holes 109 formed in an end wall thereof. Bolts 110 are inserted into the through-holes 109 and tightened into the threaded holes 100 formed in the first body segment 63 and the second body segment 64 to secure the cylindrical member 106 in an integral relationship to the front body 61.

An annular member 111 composed of a larger diameter portion 112 and a smaller diameter portion 113 is inserted in the larger diameter hole 107 and the smaller diameter hole 108 of the cylindrical member 106, respectively, as shown in FIG. 6 with a bearing 116 interposed between the annular member 111 and the cylindrical member 106 to mount the annular member 111 for rotation relative to the cylindrical member 106. The bearing 116 has a pair of races 117 and 118 which are secured to the annular member 111 and the cylindrical member 106, respectively. The annular member 111 has a hole 115 of a larger diameter than the guide hole 77 formed therein and has four threaded holes 114 formed in an end wall 113a thereof.

An annular cutter mounting member 120 has four through-holes 121 formed therein, and bolts 122 are inserted into the through-holes 121 and tightened into the threaded holes 114 to secure the annular cutter mounting member 120 in an integral relationship to the annular member 111. The annular cutter mounting member 120 has a pair of radially extending cutter mounting holes 120a and 120b formed therein, and a pair of cutters 123 and 125 having cutting blades 124 and 126 formed at ends thereof are inserted in and secured to the cutter mounting holes 120a and 120b by means of set-screws 127 such that the cutting blades 124 and 126 thereof extend in parallel to the axial direction of the guide hole 77. The rear body 62 is thus composed of the annular member 111 and the annular cutter mounting member 120.

Figure 10A:
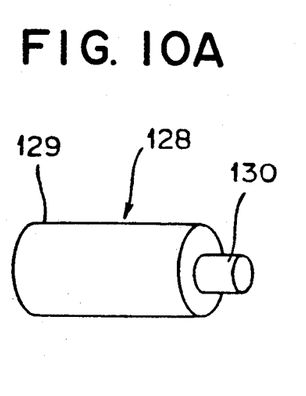
FIG. 10A is a perspective view of a jig for setting a distance over which a first cutter is to be projected.
Figure 10B:
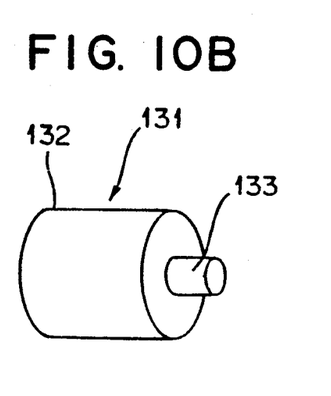
FIG. 10B is a similar view but showing another jig for setting a distance over which a second cutter is to be projected.

Referring now to FIGS. 10A and 10B, there are shown jigs for adjusting the extents of projection of the cutters. The adjusting jig 128 shown in FIG. 10A is composed of a larger diameter portion 129 having a diameter substantially equal to the outer diameter of a cable 21 to be cut, and a smaller diameter portion 130 having a diameter substantially equal to the outer diameter of the copper tube 26 of the cable 21. Meanwhile, the adjusting jig 131 shown in FIG. 10B is composed of a larger diameter portion 132 having an outer diameter with which the larger diameter portion 132 just fits with the circular hole 115 of the annular member 111, and a smaller diameter portion 133 having a diameter equal to the outer diameter of the copper tube 26.

In adjusting the projection extents of the cutters 68 and 78, at first the adjusting jig 128 is inserted into the guide hole 77, and then the cutters 68 and 78 are pushed in until they are contacted with the smaller diameter portion 130 of the adjusting jig 128, whereafter the cutters 68 and 78 are secured in position by means of the set-screws 70 and 80, respectively. In this instance, the cutters 68 and 78 are secured such that the cutting blades 69 and 79 thereof may extend in an inclined relationship by the predetermined angle with respect to the direction of the axis of the guide hole 77. This can be attained by formation of set-screw receiving recessed portions 68a and 78a at such locations of the outer peripheral walls of the cutters 68 and 78 which are offset with respect to the directions of the cutting blades 69 and 79, respectively. It is to be noted that the cutter 68 and the cutter 78 have quite the same construction, but those cutters have different reference numerals applied thereto for convenience of description. Adjustment of the projection extents of the cutters 68 and 78 can otherwise be attained by adjusting the locations of the mounting blocks 66 and 76 by means of the set-screws 67 and 75, respectively.

Meanwhile, adjustment of the projection extents of the cutters 123 and 125 is made by insertion of the larger diameter portion 132 of the adjusting jig 131 into the circular hole 115 of the annular member 111. In particular, the cutters 123 and 125 are pushed into the circular hole 115 of the annular member 111 until the end portions thereof are abutted with the smaller diameter portion 133 of the adjusting jig 131, and they are secured in position by means of the set screws 127 such that the directions of the cutting blades 124 and 126 may coincide with the axial direction of the guide hole 77. As a pair of mounting recessed portions 123a and 125a are formed on the peripheral faces of the cutters 123 and 125 in directions coincident with the directions of the cutting blades 124 and 126, the cutters 123 and 125 can be secured in position readily with the directions of the cutting blades 124 and 126 coinciding with the axial direction of the guide hole 77. It is to be noted that the cutters 123 and 125 have quite the same construction, but different reference numerals are applied to the cutters for convenience of description.

Subsequently, a description will be given of operation of the exfoliating device of the second embodiment having such a construction as described above.

A cable 21 is inserted into the guide hole 77 of the exfoliating device 60 and is pushed into the exfoliating device 60 until the cutting blades 69 and 79 of the cutters 68 and 78 cut into an end face of the cable 21. Then, in this condition, the handles 104 are operated to turn the front body 61 in one direction. Thereupon, the front body 61 is advanced and rotated in a coaxial relationship to the cable 21 under the guidance of the guide hole 77 while the cutters 68 and 78 which rotate together with the front body 61 continuously cut the synthetic resin cover layer of the cable 21 into two spirals. While the cutters 123 and 125 are advanced simultaneously with such advancement of the front body 61, the cutting blades 124 and 126 first cut into the cover layer of the cable 21 and thereafter advance straightforwards while cutting the cover layer without making a rotation due to the presence of the bearing 116 interposed between the annular member 111 and the cylindrical member 106. Consequently, the cover layer of the cable 21 is cut and exfoliated each time the front body 61 makes a half rotation due to the fact that linear cutting of the cover layer by the cutters 123 and 125 is added to spiral cutting by the cutters 68 and 78.

After the cover layer of the cable 21 is thus cut over a predetermined extent, the bolts 110 are loosened and the cylindrical member 106 and the rear body 62 are removed from the front body 61. Then, the rear body 62 removed from the front body 61 is pulled off taking care that the exposed copper tube of the cable 21 is not damaged. Subsequently, the mounting screws 94 and 97 are loosened a little, and then the first body segment 63 is pivoted around the bolt 90 relative to the second body segment 64 to its open position as shown in phantom in FIG. 7. Consequently, the front body 61 can be removed readily from the cable 21.

Figure 11:
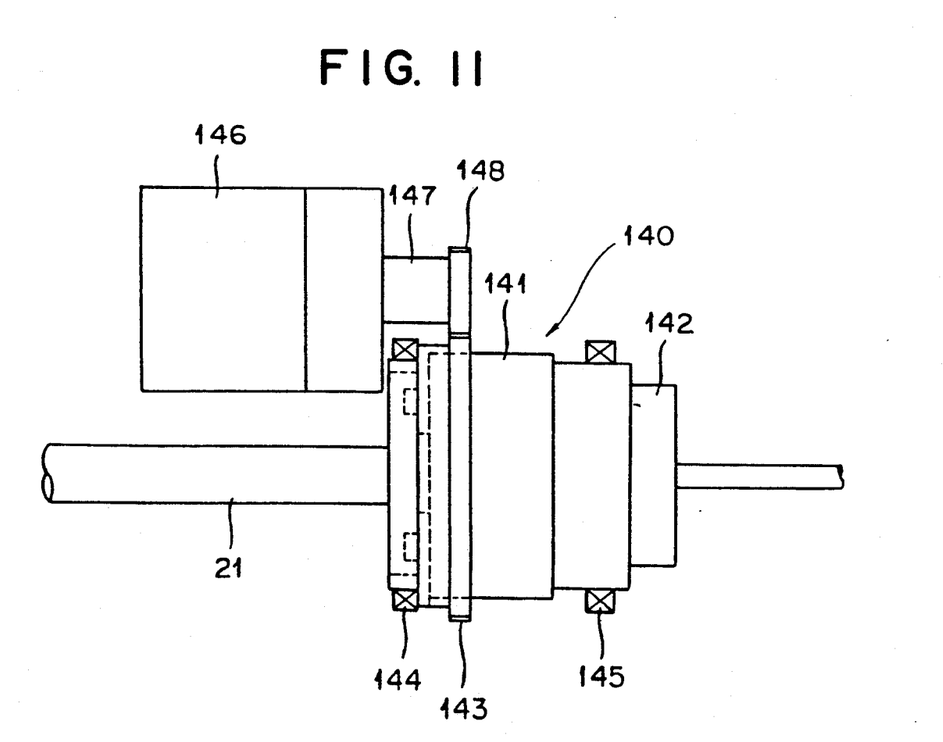
FIG. 11 is a schematic plan view showing a further embodiment of the present invention with a housing omitted.

FIG. 11 is a schematic plan view of an exfoliating device of a further embodiment of the present invention. The exfoliating device 140 includes, similarly to the exfoliating devices of the first and second embodiments described hereinabove, a front body 141 and a rear body 142 mounted for rotation on the front body 141. First cutters for spiral cutting are mounted on the front body 141 while second cutters for linear cutting are mounted on the rear body 142. A driven ring gear 143 is secured to an outer peripheral face of the front body 141, and the front body 141 to which the driven ring gear 143 is secured is mounted on a housing not shown by way of a pair of bearings 144 and 145. A driving gear 148 is secured to an output shaft 147 of a drive motor 146 and held in meshing engagement with the driven ring gear 143.

When the motor 146 is energized, the front body 141 is rotated by way of the driving gear 148 and the driven ring gear 143 so that the cover layer of a cable 21 held from rotation is cut into spirals by means of the first cutters secured to the front body 141 while the front body 141 is advanced with the motor 146 being moved along a guide not shown. Also the rear body 142 is advanced together with the front body 141 so that linear cutting of the cover layer of the cable 21 is carried out by the second cutters. It is to be noted that, as a modification to the exfoliating device of the present embodiment, the cable 21 may be fed without moving the bodies 141, 142 and the motor 146.

While in the embodiments described above an exfoliating device of the present invention is described which is applied for exfoliation of a cover layer of an optical submarine cable, the present invention can naturally be applied not only to an optical submarine cable but also to a cable having a synthetic resin cover layer of any type.

An exfoliating device of the present invention can be applied for exfoliation of a synthetic resin cover layer of any type of a cable and exhibits a maximum effect particularly where the cover layer is thick or hard as in an optical submarine cable. When a front body is rotated by means of a handle or a driving device, the exfoliating device is advanced while first and second cutters built in the exfoliating device make spiral cutting and linear cutting of the cover layer. Accordingly, an exfoliating operation of a cover layer of a cable can be carried out in safety and with certainty and can be completed in a very short period of time.

We claim:

1. A device for exfoliating a cover layer of a cable, comprising:
    a front body including a guide hole formed therein into which the cable is to be inserted;
    a first cutter including a first cutting blade at an end thereof, said first cutter secured to said front body such that said first cutting blade is projected toward an axis of the guide hole at a rear location of said guide hole and extends at a predetermined angle with respect to the direction of the axis of the guide hole;
    a rear body rotatable relative to said front body; and
    a second cutter including a second cutting blade at an end thereof, said second cutter secured to said rear body such that said second cutting blade is projected toward the axis of the guide hole and extends in parallel to the direction of the axis of the guide hole.

2. A device for exfoliating a cover layer of a cable as set forth in claim 1, further comprising:
    an additional cutter including another cutting blade provided in a spaced relationship in a circumferential direction with at least one of the first and second cutters.

3. A device for exfoliating a cover layer of a cable as set forth in claim 1, further comprising:
a plurality of handles mounted on an outer peripheral face of said front body.

4. A device for exfoliating a cover layer of a cable as set forth in claim 1, wherein said front body includes a first body segment and a second body segment, said device further comprising:
a shaft connected to the first and second segments; and
fastening means, having at least first and second positions, for coupling said first and second body segments in the first position and for allowing the first body segment to rotate around the shaft in the second position.

5. A device for exfoliating a cover layer of a cable as set forth in claim 1, wherein said first cutter and said second cutter are secured to said front body and said rear body, respectively, such that they may be projected toward the center axis of said guide hole by a distance substantially equal to the thickness of the synthetic resin cover layer of the cable to be exfoliated.

6. A device for exfoliating a cover layer of a cable as set forth in claim 1, further comprising:
a driven ring gear secured to an outer peripheral face of said front body;
a driving gear engagable with said driven ring gear; and
a driving means operatively coupled to said driven ring gear by way of said driving gear for driving said driving gear.

7. A method of using a device for exfoliating a cover layer of a cable, the device comprising a front body having a guide hole, a first cutter connected to the front body, a rear body, and a second cutter connected to the rear body, comprising the steps of:
inserting the cable into the guide hole of the device;
moving the device relative to the cable along an axis of the cable so that the first cutter of said device engages with the cable; and
rotating said device relative to the cable to exfoliate a desired length of the cable.

8. A method of exfoliating a cover layer of a cable, comprising the steps of:
cutting the cover layer in a substantially spiral manner along an axis of the cable; and
simultaneously cutting the cover layer in a substantially linear manner along the axis of the cable.

9. An article of manufacture prepared by a process comprising the steps of:
cutting a cover layer of a cable in a substantially spiral manner along an axis of the cable; and
simultaneously cutting the cover layer of the cable in a substantially linear manner along the axis of the cable.

* * * * *